T. G. ORWIG.
Fence-Post.
No. 227,990.  Patented May 25, 1880.
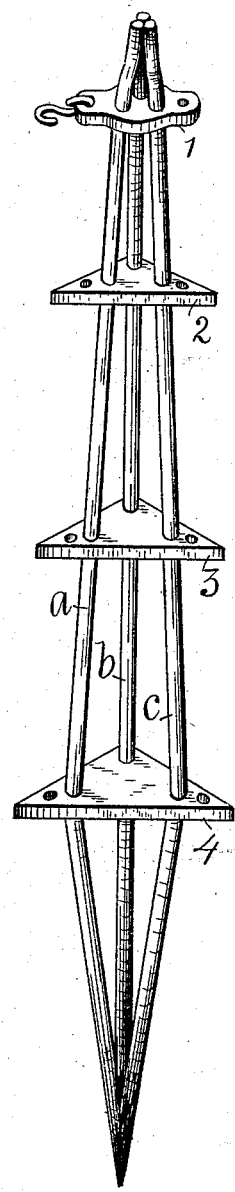
Witnesses:  Inventor:
 Thomas G. Orwig,

UNITED STATES PATENT OFFICE.

THOMAS G. ORWIG, OF DES MOINES, IOWA.

FENCE-POST.

SPECIFICATION forming part of Letters Patent No. 227,990, dated May 25, 1880,

Application filed August 19, 1879.

*To all whom it may concern:*

Be it known that I, THOMAS G. ORWIG, of Des Moines, Iowa, have invented an Improved Fence-Post, of which the following is a specification.

My invention relates to that class of iron fence-posts that have pointed butts, adapting them to be forced into the ground without first boring a hole.

Heretofore fence-posts having tapering bodies and pointed butts have been made complete in one piece of cast-iron, and cast-iron pointed butts have been connected with single wrought-iron in various ways, to produce a complete pointed post; but cast-metal posts, when made light, break too easily, and when made heavy and strong, they are too costly, and wrought-iron posts composed of a single straight rod or bar and a cast-metal butt bend and break too readily at a point immediately above the butt.

My object is to overcome these objections to light iron posts; and my invention consists in making a complete skeleton-truss-form post that will not readily bend or break, by combining two or more light wrought-iron rods or bars by means of a series of stay-plates that are graduated in width to produce a skeleton-frame and post-body, and then uniting the ends of the bars to produce a pointed butt, as hereinafter fully set forth.

My drawing is a perspective view of a complete post made of three round wrought-metal rods and four metal plates.

*a b c* represent three uniform rods or bars, that may vary in weight, form, and size, as desired.

1 2 3 4 represent a series of metal plates that are graduated in width, and perforated to allow the rods *a b c* to be passed through them. The upper plates, 1 2 3, are provided with hooks or perforations, that serve as a means of securing fence wires or rails to the posts at proper points of elevation. The lowest and largest stay-plate forms a wide base and bearing that will engage the surface of the ground and aid in keeping the post firmly fixed and perpendicular when set in the ground to support rails. These stay-plates may be made of wrought or cast metal, and vary in size, and also in form, as required, to be adapted to connect two, three, four, or more bars.

To connect the straight bars *a b c* with the plates 1 2 3 4, the bars are separately passed through the perforations in the plates and their converging top ends welded together or rigidly united in any suitable way. The lower and diverging ends are then bent inward below the lowest stay-plate, 4, and brought together and firmly united by welding, or by means of a cast-iron socket, or in any suitable way, to produce a pointed post-butt that can be readily forced into the ground.

I claim—

As an improved article of manufacture, a skeleton-truss-form fence-post having a pointed butt, composed of two or more wrought-metal rods or bars and a graduated series of perforated stay-plates, substantially as shown and described, for the purposes specified.

THOMAS G. ORWIG.

Witnesses:
ERASTUS W. SMITH,
FRANK W. HEERS.